US011428343B2

(12) United States Patent
Pannullo et al.

(10) Patent No.: US 11,428,343 B2
(45) Date of Patent: Aug. 30, 2022

(54) MECHANICAL OVERFILL PREVENTION VALVE INSERTABLE WITHIN A FILL PIPE

(71) Applicant: Joseph Pannullo, Essex Fells, NJ (US)

(72) Inventors: Joseph Pannullo, Essex Fells, NJ (US); Joseph Correia, Cedar Grove, NJ (US)

(73) Assignee: Joseph Pannullo, Essex Fells, NJ (US)

( * ) Notice: Subject to any disclaimer, the term of this patent is extended or adjusted under 35 U.S.C. 154(b) by 0 days.

(21) Appl. No.: 17/585,463

(22) Filed: Jan. 26, 2022

(65) Prior Publication Data
US 2022/0235877 A1 Jul. 28, 2022

Related U.S. Application Data

(60) Provisional application No. 63/208,811, filed on Jun. 9, 2021, provisional application No. 63/142,225, filed on Jan. 27, 2021.

(51) Int. Cl.
| | |
|---|---|
| *F16K 31/20* | (2006.01) |
| *F16K 37/00* | (2006.01) |
| *F16K 31/46* | (2006.01) |

(52) U.S. Cl.
CPC ............ *F16K 31/20* (2013.01); *F16K 31/465* (2013.01); *F16K 37/0083* (2013.01)

(58) Field of Classification Search
CPC .......... F16K 31/18; F16K 31/22; F16K 31/24; G05D 16/2066
USPC .................................. 137/444, 409, 429, 430
See application file for complete search history.

(56) References Cited

U.S. PATENT DOCUMENTS

| 52,618 A | 2/1866 | Stansell |
| 143,143 A | 9/1873 | Hallas |
| RE6,844 E | 1/1876 | Ambrose |
| 252,195 A * | 1/1882 | Decker .................. F16K 31/20 |
| | | 137/430 |

(Continued)

FOREIGN PATENT DOCUMENTS

| EP | 96111 A2 | 12/1983 |
| JP | 63201422 A | 8/1988 |

(Continued)

OTHER PUBLICATIONS

Final Office Action for U.S. Appl. No. 17/138,322 dated Mar. 15, 2022, 21 pages.

(Continued)

*Primary Examiner* — Umashankar Venkatesan
(74) *Attorney, Agent, or Firm* — Maine Cernota & Rardin

(57) ABSTRACT

An overfill prevention valve cooperative with a standpipe includes a plug, float, and seat that do not exceed the standpipe in diameter. The valve and standpipe can be inserted into a liquid holding tank from below. Rising liquid lifts the float and plug until the plug is sealed against the seat. The float can be above the seat and connected to the plug by a rod penetrating centrally through the seat. A check valve can enable draining of the holding tank when the liquid is withdrawn from the standpipe. The holding tank can be a fuel tank of a liquid fuel burning torch. A central reservoir system can automatically fill a plurality of holding tanks having the disclosed valves installed therein and connected in series by a plumbing system. Filling can be automatically terminated when a backpressure within the plumbing system exceeds a specified threshold.

19 Claims, 14 Drawing Sheets

(56) References Cited

U.S. PATENT DOCUMENTS

| | | | | |
|---|---|---|---|---|
| 262,804 A * | 8/1882 | Marichenski | ............ | F16K 31/24 137/565.17 |
| 372,020 A | 10/1887 | Hardcastle | | |
| 418,113 A | 12/1889 | Marzo | | |
| 594,264 A | 11/1897 | Miller | | |
| 771,567 A * | 10/1904 | O'Brien | .................. | F16K 31/26 137/437 |
| 826,423 A | 7/1906 | Haden | | |
| 945,569 A * | 1/1910 | Millea | ..................... | F16K 31/26 403/97 |
| 1,142,816 A | 6/1915 | Kaufman | | |
| 1,161,745 A * | 11/1915 | Springman | ............. | F16K 31/26 137/433 |
| 1,259,791 A * | 3/1918 | Simmons | ................ | F16K 31/22 137/433 |
| 1,310,560 A * | 7/1919 | Cook | ....................... | F16K 31/22 137/433 |
| 1,349,267 A * | 8/1920 | Craig | ...................... | F16K 31/20 137/425 |
| 1,391,956 A * | 9/1921 | Henry | ..................... | F23D 11/44 137/445 |
| 1,442,228 A * | 1/1923 | La Salle | ................. | F16K 31/30 137/391 |
| 1,763,164 A | 6/1930 | Lavigne | | |
| 1,790,480 A * | 1/1931 | Macomber et al. | .... | E21B 21/10 137/429 |
| 1,905,918 A * | 4/1933 | Gregorius | ................. | F23D 3/28 236/1 R |
| 2,197,686 A * | 4/1940 | Flutsch | .................... | F16K 31/22 137/426 |
| 2,210,751 A * | 8/1940 | Cronkhite | ............... | F16K 17/42 137/181 |
| 2,276,039 A | 3/1942 | Horther | | |
| 2,495,230 A | 1/1950 | Day et al. | | |
| 2,604,113 A * | 7/1952 | Barsano | .................. | E03C 1/108 137/218 |
| 3,817,686 A | 6/1974 | Quittner | | |
| 4,193,417 A | 3/1980 | Bowman | | |
| 4,417,870 A | 11/1983 | Nakamura | | |
| 4,470,433 A | 9/1984 | Vipond | | |
| 4,582,478 A | 4/1986 | Hilker | | |
| 4,667,278 A | 5/1987 | Poyer | | |
| 4,835,663 A * | 5/1989 | Abbott | .................... | F21S 13/00 362/159 |
| 4,847,192 A | 7/1989 | Fujimoto | | |
| 4,974,134 A | 11/1990 | Bourne | | |
| 5,057,005 A | 10/1991 | Kwok | | |
| 5,263,794 A | 11/1993 | Webb | | |
| 5,297,896 A | 3/1994 | Webb | | |
| 5,472,340 A | 12/1995 | Lynch | | |
| 5,540,250 A | 7/1996 | Mullins | | |
| 5,932,842 A | 8/1999 | Eberl | | |
| 5,980,238 A | 11/1999 | Collins, Sr. | | |
| 6,006,773 A | 12/1999 | Bravo | | |
| 6,370,738 B1 | 4/2002 | Dion, Jr. | | |
| 6,746,235 B1 * | 6/2004 | Aszenbrenner | ........... | F23D 3/02 431/125 |
| 8,191,932 B2 | 6/2012 | Davis | | |
| 8,390,981 B1 | 3/2013 | Treadaway | | |
| 8,435,029 B2 | 5/2013 | Masterson et al. | | |
| 8,823,714 B1 | 9/2014 | Thielvoldt | | |
| 9,249,897 B2 | 2/2016 | Acosta | | |
| 9,267,681 B2 | 2/2016 | Barudi et al. | | |
| 9,810,426 B2 | 11/2017 | Bauswell et al. | | |
| 10,317,077 B2 | 6/2019 | Hansen et al. | | |
| 10,485,367 B2 * | 11/2019 | Kopolowitz | ........... | A47G 33/00 |
| 10,842,146 B1 | 11/2020 | Pannullo | | |
| 2002/0146656 A1 | 10/2002 | Thigpen | | |
| 2005/0104371 A1 | 5/2005 | Atkinson | | |
| 2006/0134571 A1 | 6/2006 | St-Germain | | |
| 2007/0160944 A1 | 7/2007 | Knight | | |
| 2011/0198550 A1 | 8/2011 | Howard | | |
| 2011/0198551 A1 | 8/2011 | Howard | | |
| 2012/0258412 A1 | 10/2012 | Jackow | | |
| 2012/0282559 A1 | 11/2012 | Barudi et al. | | |
| 2013/0101946 A1 | 4/2013 | Masterson et al. | | |
| 2013/0114244 A1 | 5/2013 | Formico | | |
| 2013/0149651 A1 | 6/2013 | Thielvoldt | | |
| 2014/0134546 A1 | 5/2014 | Masterson et al. | | |
| 2014/0362560 A1 | 12/2014 | Formico | | |
| 2014/0366262 A1 | 12/2014 | Flynn | | |
| 2014/0371927 A1 | 12/2014 | Pooladsanj | | |
| 2015/0047627 A1 | 2/2015 | Thielvoldt | | |
| 2015/0144713 A1 | 5/2015 | Formico | | |
| 2016/0113094 A1 | 4/2016 | Wagner et al. | | |
| 2016/0286627 A1 | 9/2016 | Chen et al. | | |
| 2017/0254532 A1 | 9/2017 | Bauswell | | |
| 2017/0268775 A1 | 9/2017 | Lev | | |
| 2018/0072965 A1 | 3/2018 | Han | | |
| 2020/0003412 A1 | 1/2020 | Bianchini | | |
| 2021/0071855 A1 | 3/2021 | Pan | | |

FOREIGN PATENT DOCUMENTS

| | | |
|---|---|---|
| JP | 2003343837 A | 5/2002 |
| JP | 2006289266 A | 10/2006 |
| WO | 2011046287 A2 | 4/2011 |

OTHER PUBLICATIONS

Advisory Office Action for U.S. Appl. No. 17/138,322, dated Aug. 27, 2021, 4 Pages.

Final Office Action for U.S. Appl. No. 17/138,322 dated Jun. 17, 2021, 27 pages.

International Search Report and Written Opinion for PCT Appl. No. PCT/US2020/062120, dated Apr. 15, 2021, 15 Pages.

Notice of Allowance for U.S. Appl. No. 16/928,767, dated Oct. 2, 2020, 5 Pages.

Office Action for U.S. Appl. No. 17/138,322, dated Sep. 24, 2021, 20 Pages.

Office Action for U.S. Appl. No. 17/138,322, dated Mar. 30, 2021, 21 Pages.

Office Actions for U.S. Appl. No. 16/928,767, dated Sep. 11, 2020, 29 Pages.

International Search Report and Written Opinion for PCT Appl. No. PCT/US2022/013950, dated May 4, 2022, 13 pages.

* cited by examiner

MECHANICAL OVERFILL PREVENTION VALVE INSERTABLE WITHIN A FILL PIPE

RELATED APPLICATIONS

This application claims the benefit of U.S. Provisional Application No. 63/142,225, filed Jan. 27, 2021. This application also claims the benefit of U.S. Provisional Application No. 63/208,811, filed on Jun. 9, 2021. Both of these applications are herein incorporated by reference in their entirety for all purposes.

FIELD OF THE INVENTION

The invention relates to apparatus for controlling fluid flow into a holding tank, and more particularly, to mechanical devices that prevent overfilling of a holding tank.

BACKGROUND OF THE INVENTION

There are many applications where it can be desirable to automatically limit the fill level of a holding tank or other liquid container. A very common example is the water-holding tank of a flush toilet, for which there are many different designs in use that automatically open the fill valve when the tank is emptied, and close the fill valve when the water level in the tank reaches a desired "full" level.

For most of these solutions, installation of the fill-limiting mechanism into the holding tank or vessel that is to be filled requires that ready access be available to the interior of the holding tank, so that a relatively large apparatus can be inserted into the tank while a much smaller pipe or fitting extends through a hole provided at the bottom of the tank for connection to a filling pipe or hose. Furthermore, many of these designs are directed to filling a tank with water or another innocuous fluid, such that exposure to the liquid is not toxic. This allows the design to be relatively complex and consequently less reliable, because the mechanism is easily replaced without any health or environmental concerns, so that it is not necessary for the mechanism to be highly reliable over long periods of time.

Applications exist, however, wherein the interior of a liquid-storing tank is not accessible, except possibly through a few small ports, and where it is necessary to retrofit the tank with a refilling mechanism that is prevented from overfilling of the tank. One example is the conversion of a liquid-fueled torch, such as a so-called "tiki" torch, from being manually refilled through an upper fill port to being automatically refilled via a fuel pipe that enters the tank through a small port from below.

When the interior of a liquid storage tank is not openly accessible, it can be difficult to implement a purely mechanical solution for preventing overfilling, because any such solution will generally require that a float or similar element be inserted into the interior of the tank through a large opening, such as an open top of the tank.

Instead, one approach is to control the flow of liquid into the holding tank through a liquid refill pipe using an electrically controlled valve that is located exterior to the holding tank, and to introduce at least one liquid level sensor into the holding tank through a small opening provided proximal to the top of the tank. In the case of a tiki torch that is converted for automatic refilling, for example, the level sensors can be inserted through the port near the top of the torch that was previously used for manual filling of the fuel tank. A controller is thereby able to actuate the electric valve according to data provided by the level sensors, and thereby initiate filling when the tank is nearly empty, and stop the flow of liquid into the tank when the tank is nearly full. According to this approach, the required access to the interior is limited, at most, to only a small opening through which the refill pipe is inserted, and a small opening through which the level sensor(s) is/are inserted.

While this electronic approach can be effective, it can also be too complex and expensive for some applications, especially when a plurality of holding tanks are to be automatically filled from a common source, due at least to the requirement that a controller and electric valve be associate with each of the tanks. Also, this approach may not be sufficiently reliable for some applications, because the electrically controlled valves and/or the controllers may require periodic maintenance and/or replacement.

What is needed, therefore, is an apparatus for refilling a liquid holding tank that can be inserted into the interior of the holding tank through a small opening, and that includes a simple, reliable, purely mechanical overfill prevention valve.

SUMMARY OF THE INVENTION

The present invention is an apparatus for refilling a liquid holding tank. The apparatus can be inserted into the interior of the holding tank through a small opening, and includes a simple, reliable, purely mechanical overfill prevention valve. According to the present invention, a substantially straight pipe, referred to herein as a "standpipe," is inserted into the holding tank through a small port in the base of the tank, and extends vertically into the interior of the holding tank. The standpipe is essentially a liquid fill pipe that is configured to enable liquid to flow therethrough into the interior of the holding tank.

A simple mechanical overfill prevention valve is included, either in series with or entirely contained within an upper portion of the standpipe. The overfill prevention valve includes a float that is lifted within the standpipe by the liquid as the tank is filled, and a seat that is sealed by a plug when the float has been lifted to a sufficient degree. In some embodiments, the float also functions as the plug, while in other embodiments the float and plug are separate components that are interlinked, so that the plug is caused to rise when the float is lifted up by the liquid. In some embodiments, during filling, the liquid flows through the seat, and out of the top of the standpipe. In other embodiments, liquid passages or "fill ports" are provided in the side wall of the standpipe that permit the liquid to flow into the tank without having to flow out of the top of the standpipe. Embodiments can also include "overflow ports" that penetrate the side wall of the standpipe to enable the liquid within the tank to enter the standpipe and so that it can lift the float.

In embodiments, the liquid storage tank is the fuel tank of a liquid fuel burning torch, such as a so-called "tiki" torch. In some of these embodiments, a small opening is formed at the bottom of the torch fuel tank, through which the standpipe is inserted, for example when converting the tiki torch from a manually filled configuration to an automatically filled configuration.

System embodiments include a central liquid reservoir that is connected to a plurality of liquid fill pipes associated with a plurality of liquid holding tanks, as well as a pump that is configured to pressurize the liquid so that it flows into the holding tanks.

In some of these embodiments, the liquid in the liquid fill pipe is maintained at pressure, so that each holding tank is filled whenever its overfill prevention valve opens. As a result, a relatively constant liquid level is maintained in each liquid storage tank.

In other embodiments, each of the holding tanks includes at least one electronic level sensor that is inserted through a port provided near the top of the holding tank. The level sensors are monitored by a single controller, which activates the pump whenever any one of the sensors indicates a low liquid level, at which point each of the liquid storage tanks is filled until its overfill prevention valve is engaged. In some of these embodiments, the pump is deactivated after a specified interval of time, while other embodiments include additional level sensors in the liquid storage tanks that provide an indication of when the tank is full, and the central controller shuts off the pump when the sensors indicate that all of the tanks have been filled.

In various embodiments, the standpipe extends above the float so as to prevent interference between the float and other elements included within the tank interior, such as a level sensor or a torch wick.

A first general aspect of the present invention is a liquid filling apparatus compatible for installation within a liquid holding tank, the liquid filling apparatus being configured to enable filling of the liquid holding tank with the liquid while preventing the liquid from overfilling the holding tank. The liquid filling apparatus includes a standpipe having an outer wall, the standpipe being suitable for vertical insertion into the liquid holding tank, the standpipe being configured to permit the liquid to flow therethrough into the interior of the liquid holding tank, and a liquid overfill protection valve that is either in series with or is entirely contained within an upper portion of the standpipe, the liquid overfill protection valve having a valve diameter that is everywhere less than or equal to a diameter of an outer wall of the standpipe. The liquid overfill protection valve includes a central passage in liquid communication with the standpipe, a fill port in liquid communication with an interior of the holding tank, a valve seat penetrated by the central passage, a float, and a valve plug located within or below the valve seat and configured to be lifted by the float to form a seal with a constricted region of the valve seat when the liquid holding tank is filled with the liquid, the liquid overfill prevention valve being open when the valve plug is below the valve seat, and closed when the valve plug is sealed against the valve seat.

The liquid overfill protection valve, when open, is configured to allow the liquid to flow from the standpipe through the central passage, through the fill port, and into the interior of the liquid holding tank. The liquid overfill protection valve, when closed, is configured to prevent the liquid from flowing from the standpipe into the interior of the liquid holding tank.

In embodiments, the float is located above the valve seat, and is interconnected to the valve plug by a rod or filament extending from the float through the central passage of the valve seat to the valve plug.

In any of the above embodiments, the fill port can penetrate the valve seat, thereby providing liquid communication between the central passage of the valve seat and the interior of the liquid holding tank.

In any of the above embodiments, the standpipe can extend above the float, the float thereby remaining within the standpipe when the float is lifted by the liquid and the valve is closed. Some of these embodiments further include at least one overflow port located above the constricted region of the valve seat and configured to ensure that a liquid level at the float is equal to a liquid level in the holding tank. Or, the standpipe can extend both below and above the valve seat, but be interrupted by a region of the valve seat having an outer diameter that is the same as an outer diameter of the standpipe.

In any of the above embodiments, the central passage can be configured to direct a flow of the liquid through a flow path to the fill port without the liquid flow directly impinging on the valve plug. In some of these embodiments, when the liquid overflow prevention valve is open, the plug is suspended within a plug chamber that is in liquid communication with the liquid flow but is located below the flow path.

Any of the above embodiments can further include a draining valve configured to automatically open and allow the liquid to flow from the interior of the holding tank into the standpipe when the liquid overfill prevention valve is closed and a pressure of the liquid in the holding tank is greater than a pressure in the stovepipe by more than a threshold pressure difference.

Any of the above embodiments can further include a fill tube inserted within the standpipe, a distal end of the fill tube being shaped so as to be re-directed downward, the valve seat being installed within the downwardly directed portion of the fill tube, the liquid filling apparatus being configured when the liquid overfill prevention valve is open to enable the liquid to flow through the fill tube into the standpipe, and from thence into the interior of the liquid holding tank. In some of these embodiments, the valve plug is the float. Any of these embodiments can further include a constriction provided at the distal end of the fill pipe, the constriction being configured to confine the valve plug so that it remains within the fill pipe.

Any of the above embodiments can further include an elastomeric sealing ring included in the constricted region of the valve seat and configured to form a seal with the valve plug when the valve plug is lifted into contact with the sealing ring. Or, the valve plug can be elastomeric, and can be configured to form a liquid seal by direct contact thereof with the valve seat.

A second general aspect of the present invention is a liquid fuel burning torch that includes a fuel tank having an interior, an insertion port provided in a bottom of the fuel tank, and a liquid filling apparatus according to the first general aspect, the liquid filling apparatus being inserted through the access port into the interior of the fuel tank.

A third general aspect of the present invention is a system that includes a central liquid reservoir, a pump in liquid communication with the liquid reservoir, a plurality of liquid holding tanks, each of the liquid holding tanks having installed therein a corresponding liquid filling apparatus according to the first general aspect, and a liquid plumbing system interconnecting each of the liquid filling apparatuses with the pump.

In embodiments, the liquid plumbing system interconnects the liquid filling apparatuses in series.

In any of the above embodiments, the system can be configured to maintain liquid pressure within the liquid plumbing system, each of the holding tanks being automatically refilled thereby whenever its corresponding liquid overfill prevention valve is open. Or the central controller can be configured to cause the pump to be activated whenever a pressure of the liquid within the liquid plumbing system falls below a specified refill pressure, and to be deactivated when the pressure of the liquid within the liquid plumbing system rises above the specified refill pressure.

And in any of the above embodiments wherein the system is not configured to maintain liquid pressure within the liquid plumbing system, the central controller can be configured to cause the pump to be deactivated whenever a pressure of the liquid within the liquid plumbing system rises above a specified filled pressure.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
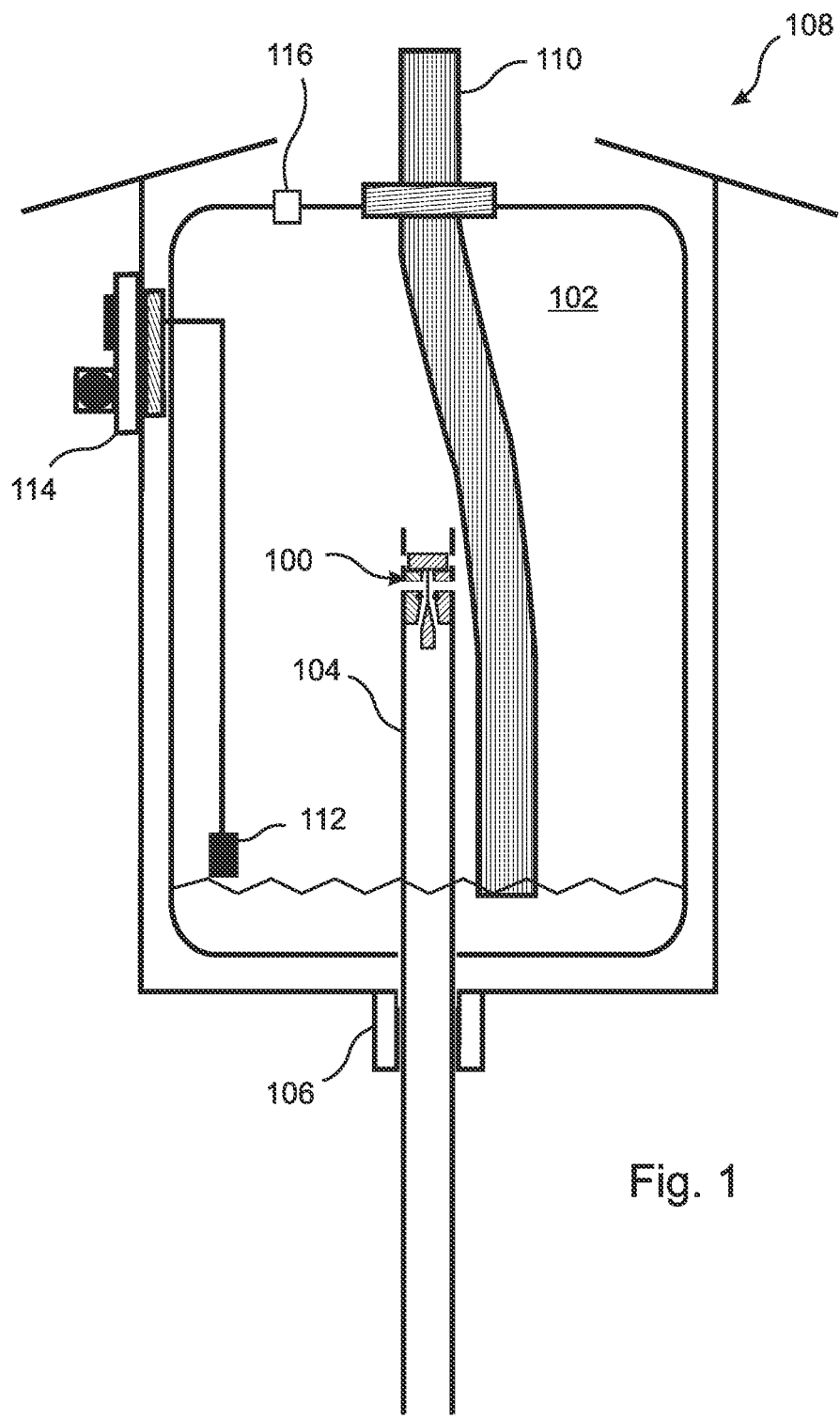
FIG. 1 is a cross sectional illustration of a fuel-burning torch having a standpipe and liquid overfill prevention valve according to a first embodiment of the present invention installed therein.

With reference to FIG. 1, the present invention is an apparatus for refilling a liquid holding tank 102. The apparatus can be inserted into the interior of the holding tank 102 through a small opening 106 provided in the bottom of the tank 102, and includes a simple, reliable, purely mechanical overfill prevention valve 100 that does not require any electrical power, solenoid, etc.

According to the present invention, a standpipe 104 is inserted into the tank 102 through the small port 106 that is provided in the base of the tank 102, and extends vertically into the interior of the tank 102. The standpipe 104 functions as a liquid fill pipe that is configured to enable liquid to flow therethrough into the interior of the holding tank 102.

In FIG. 1, the holding tank 102 is a fuel tank of a fuel-burning "tiki" torch 108 that has been converted from a manually filled configuration to an automatically filled configuration. The conversion includes forming the small opening 106 at the bottom of the fuel tank 102, and inserting the standpipe 104 through the small opening 106 into the interior of the fuel tank 102. The interior of the fuel tank 102 further contains a wick 110 and a level sensor 112 that is sensed and controlled by a WIFI-enabled plug 114 inserted through a port near the top of the tank 102. The level sensor 112 can be used, for example, to determine when the holding tank 102 is nearly empty, so as to trigger activation of a pump to begin a re-fill. The torch 108 further includes a small vent 116 that maintains the holding tank at ambient pressure. While FIG. 1 illustrates an embodiment that is applied to a torch, it will be understood that the scope of the present invention is not limited to torch embodiments, but extends to all applications where a tank refilling apparatus that includes a liquid overfill prevention valve is to be installed within the interior of a liquid holding tank.

Figure 2A:
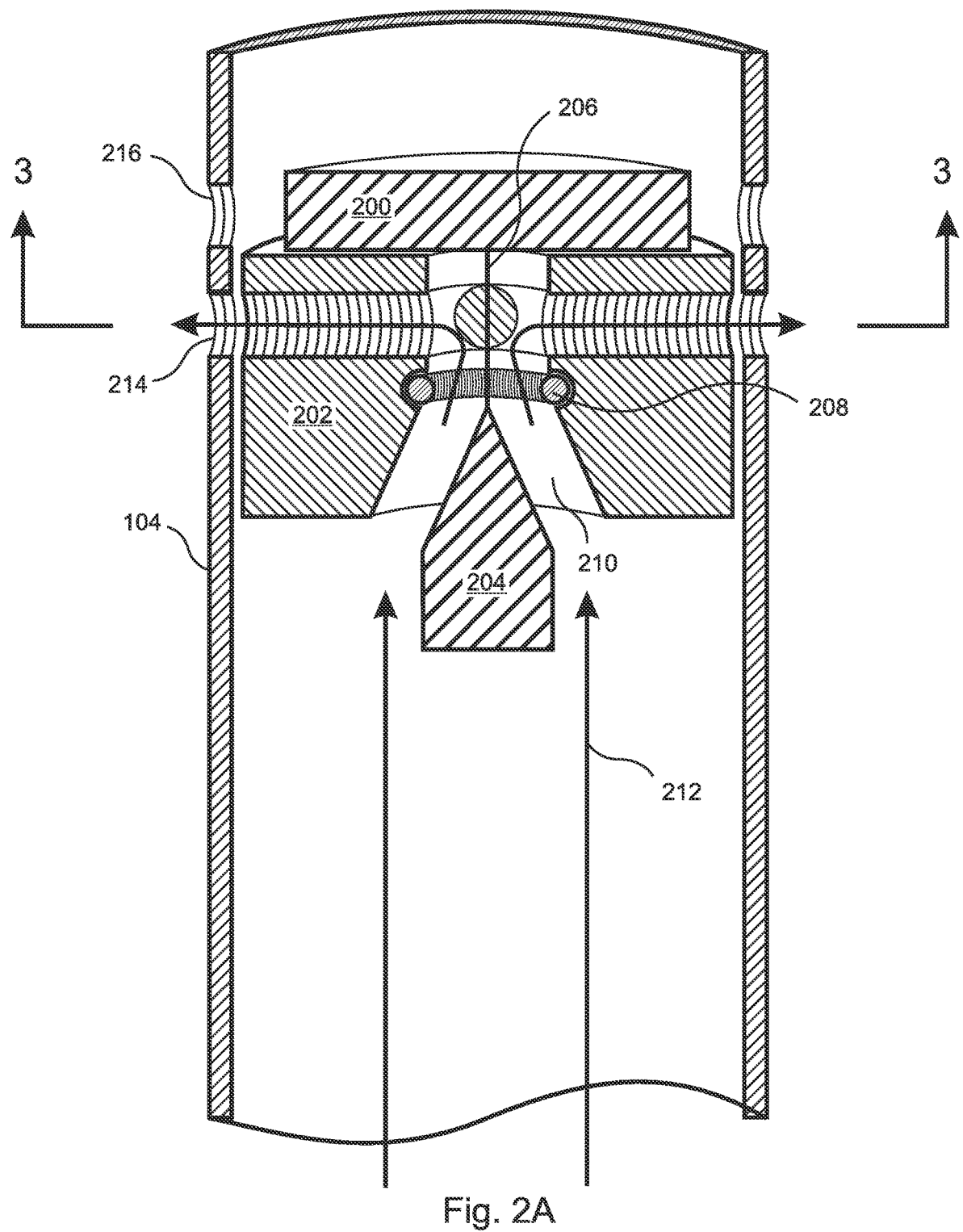
FIG. 2A is a sectional view of the standpipe and liquid overfill prevention valve of FIG. 1, shown in an open state.
Figure 2B:
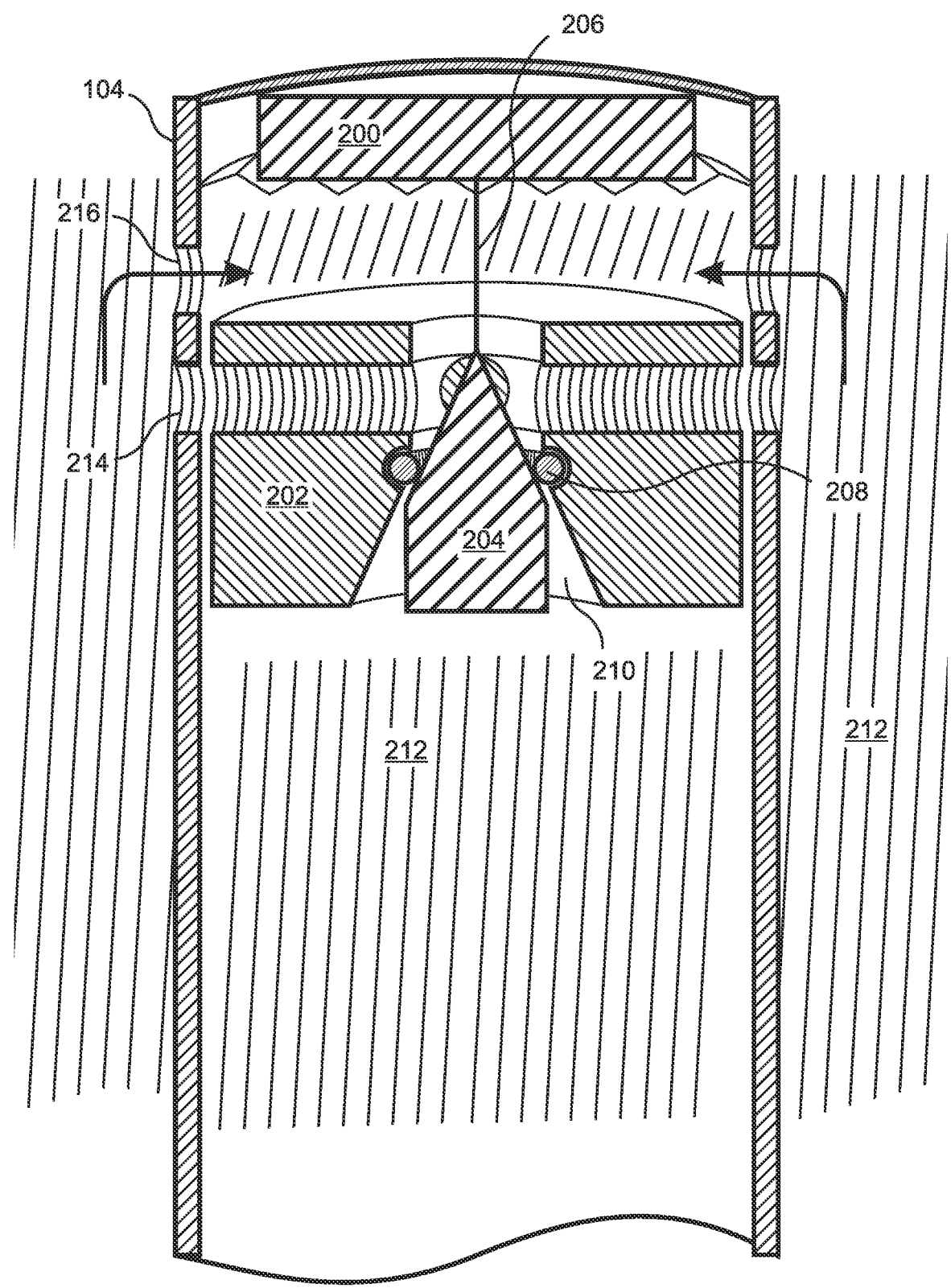
FIG. 2B is a sectional view of the standpipe and liquid overfill prevention valve of FIG. 2A, shown in a closed state.

With reference to FIGS. 2A and 2B, the overfill prevention valve 100 is inserted and contained within an upper portion of the standpipe 104. The overfill prevention valve 100 includes a float 200 that is lifted by the liquid as the holding tank 102 is filled, and a seat 202 that is sealed by a plug 204 when the float 200 has risen by a certain amount. In the embodiment of FIGS. 2A and 2B, the float 200 and plug 204 are separate components that are interlinked by a wire or rod 206, so that the plug 202 is caused to rise when the float 200 is lifted up by the liquid. In the illustrated embodiment, an O-ring 208 is included within a tapered central passage 210 of the seat 202, such that the liquid 212 flows into the tank 102, as shown in FIG. 2A, until the plug 204 is lifted sufficiently to be pressed into the O-ring 208, at which point the liquid flow into the tank 102 is blocked, as is illustrated in FIG. 2B.

In some embodiments, the incoming liquid flows past the float 200 so as to flow into the tank 102 from the top of the standpipe 104. In the embodiment of FIGS. 2A and 2B, fill ports 214 are provided in the side of the standpipe 104, so that the incoming liquid is not forced to flow past the float 200.

The embodiment of FIGS. 2A and 2B further includes overflow ports 216 that ensure that the liquid is able to reach the float 200 when the liquid level outside of the standpipe 104 rises above the float 200.

Figure 3:
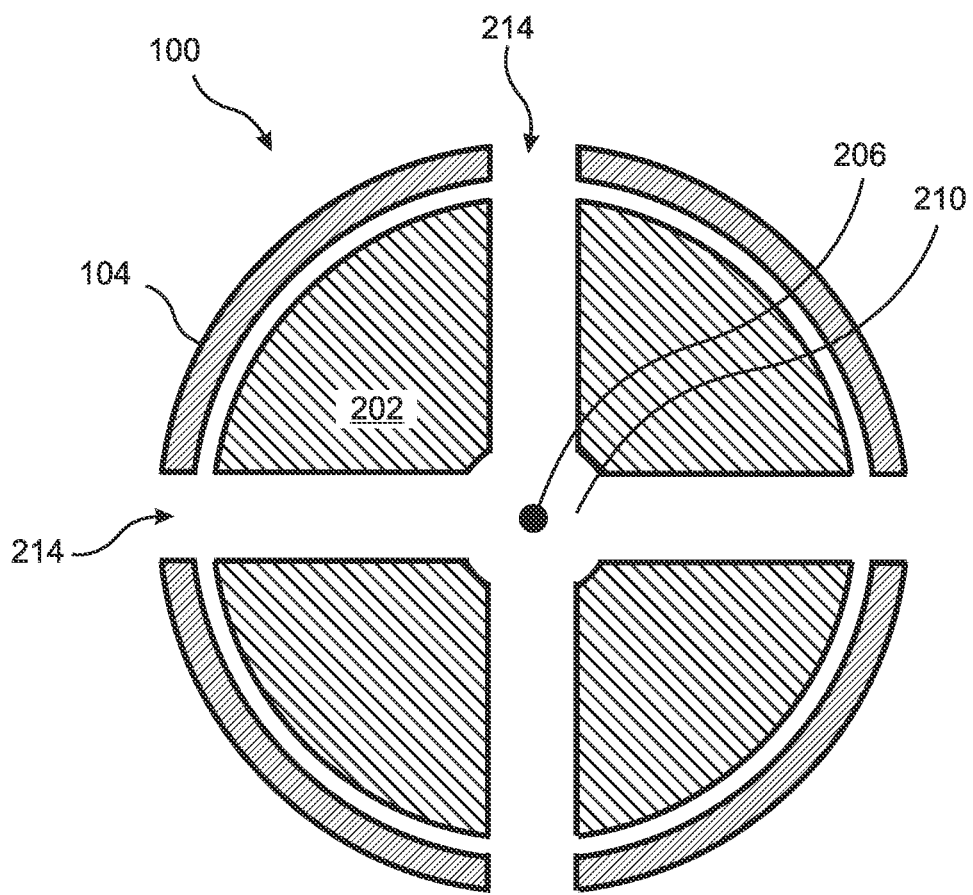
FIG. 3 is a cross-sectional view of the embodiment of FIG. 2A.

FIG. 3 is a cross-sectional illustration of the embodiment of FIG. 2A. It can be seen that four equally spaced fill ports 214 are provided in the side wall of the standpipe 104.

Figure 4A:
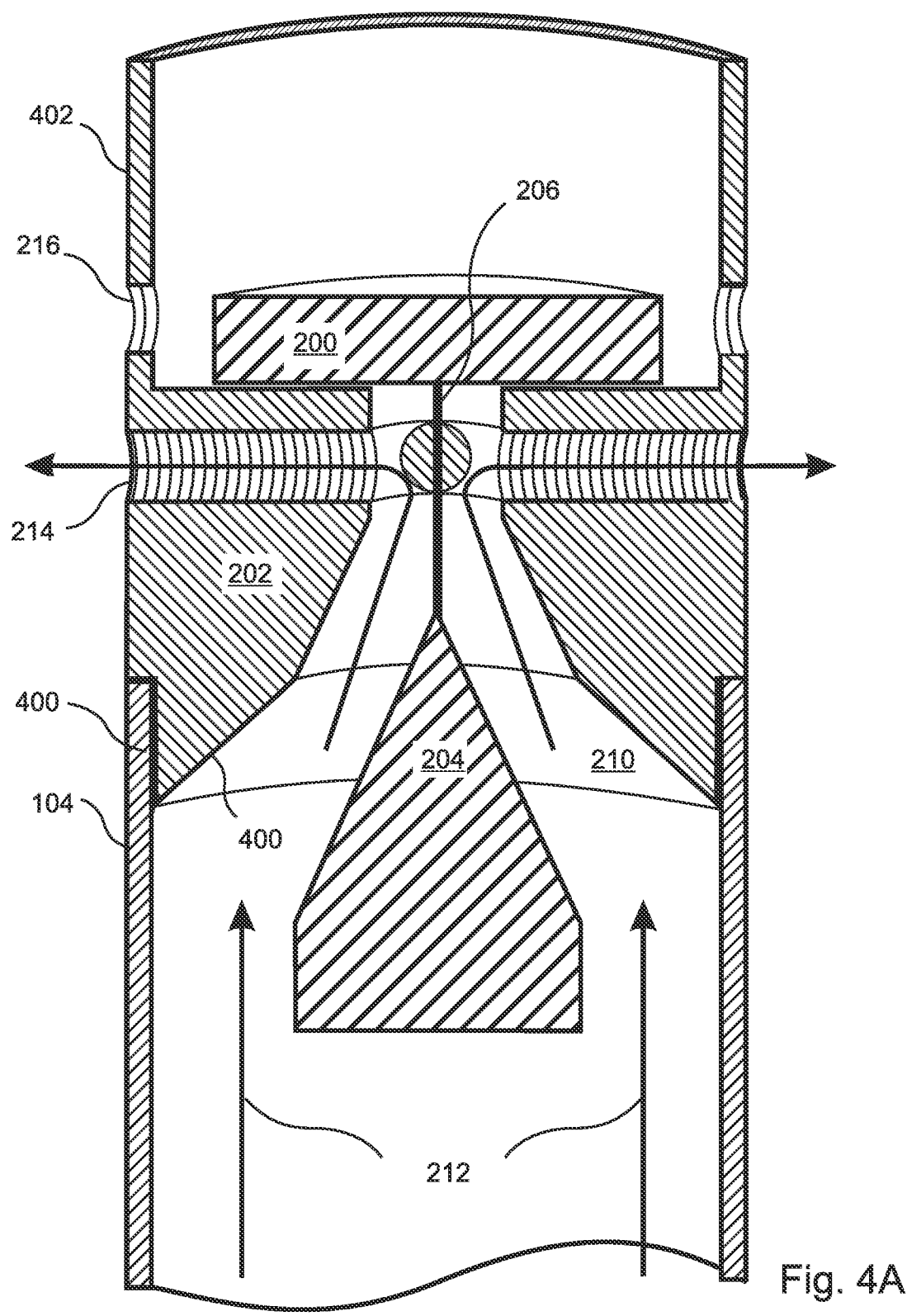
FIG. 4A is a sectional view of the standpipe and liquid overfill prevention valve in a second embodiment of the present invention, shown in an open state.
Figure 4B:
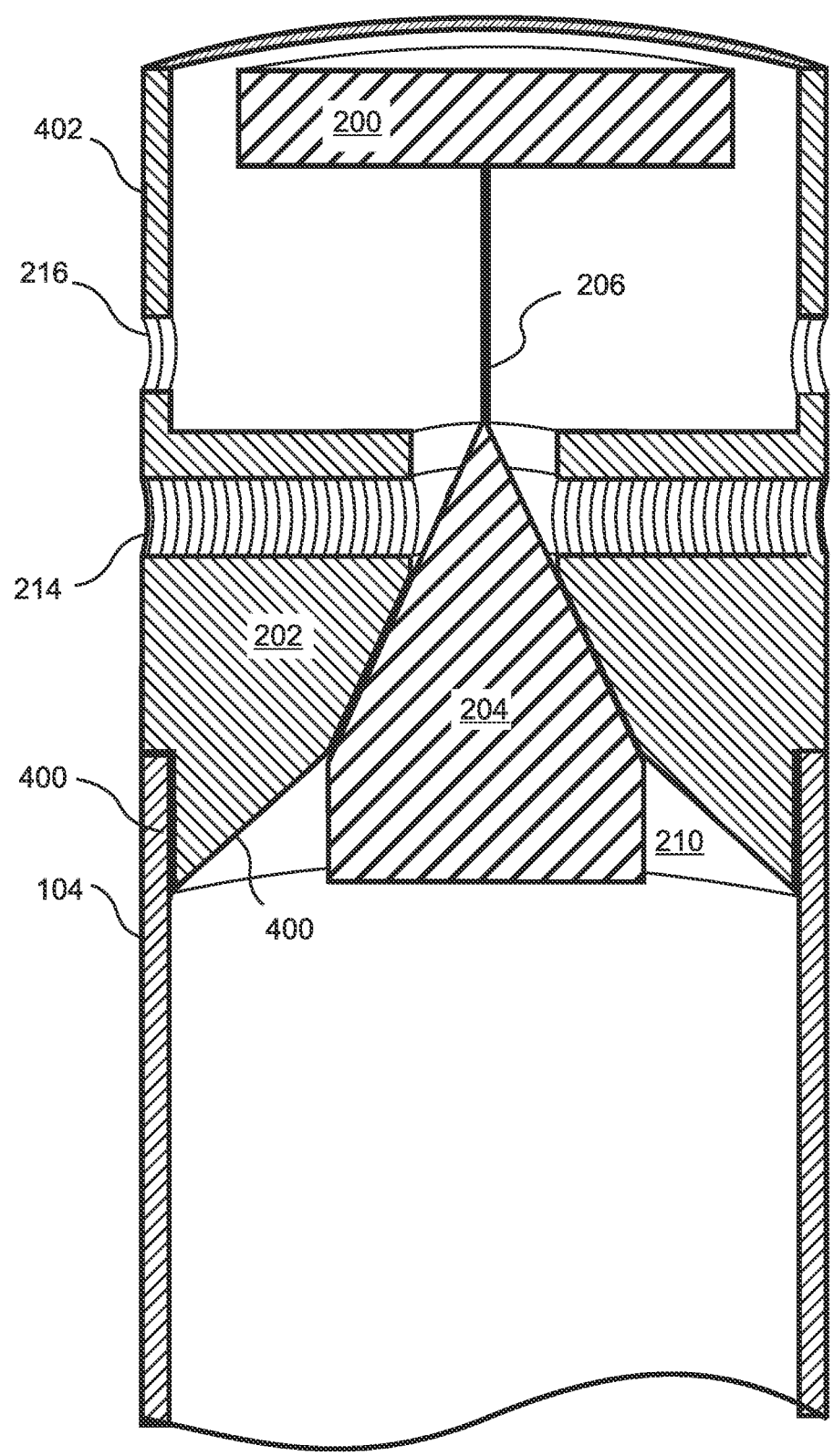
FIG. 4B is a sectional view of the second embodiment, shown in a closed state.

FIGS. 4A and 4B illustrate an embodiment that is similar to the embodiment of FIGS. 2A and 2B, except that the overfill prevention valve 100 is installed in series with the standpipe 104, rather than being contained entirely within the standpipe 104. In the illustrated example, the overfill prevention valve 100 includes a stem 400 that is press-fit into the top of the standpipe 104. In similar embodiments, the stem 400 is attached to the top of the standpipe 104 by threaded insertion, by an adhesive, or by any other attachment means known in the art.

The diameter of the seat 202 in this embodiment is the same as the diameter of the standpipe 104, except for the stem 400 that is inserted into the standpipe 104. The seat 202 in this embodiment further includes a collar 402 that extends upward to surround the float 200 so that the float 200 can be lifted by the incoming liquid 212 within the collar 402, thereby eliminating any concern that the float 200 might contact any other structures within the holding tank 102, such as a wick 110 or level sensor 112. The collar 402 is essentially an extension of the standpipe 104 above the seat 202.

Another difference between the embodiment of FIGS. 2A and 2B and the embodiment of FIGS. 4A and 4B is that the embodiment of FIGS. 4A and 4B does not include an O-ring 208. Instead, when the float 200 is lifted, the plug 204 forms a seal directly with the tapered central passage 210 of the seat 202. In embodiments, the plug is made from an elastic material such as synthetic rubber or a compressible plastic, so that a liquid-tight seal is formed between the plug 204 and the seat 202 without need for an intervening O-ring 208. FIG. 4A illustrates the embodiment in its "open" configuration, while FIG. 4B illustrates the embodiment in its "closed" configuration.

Figure 5A:
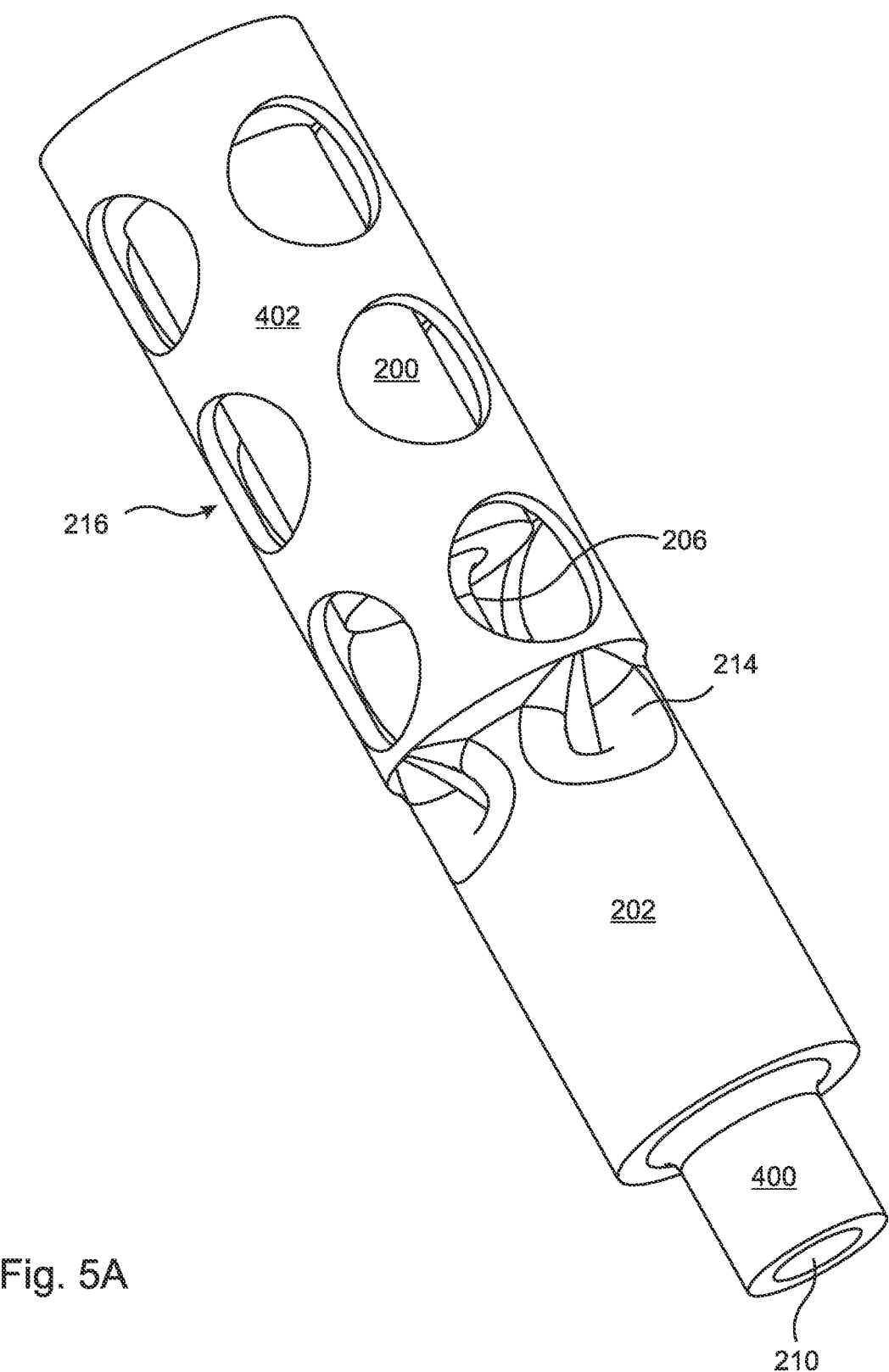
FIG. 5A is a perspective side view of a third embodiment of the present invention.

FIG. 5A is a perspective view of an embodiment that functions in a manner similar to FIG. 2, but wherein the liquid is routed such that it does not directly impact the plug 204 as the liquid flows from the standpipe 104 into the holding tank 102. Instead, with reference to the cross-sectional drawing of FIG. 5B, the plug 204 is suspended within a plug chamber 500 that is in liquid communication with the flow of liquid into the holding tank 102, but is located below the flow path of the liquid, so that the plug 204 is offset from the flow path. This approach avoids any concern that rapidly flowing liquid during filling of the holding tank 102 could push the plug 204 upward into the seat 202 before it is lifted by the float 200, thereby prematurely closing the valve 100, and possible leading to repetitive closing and opening of the valve 100 as it is filled.

Figure 5B:
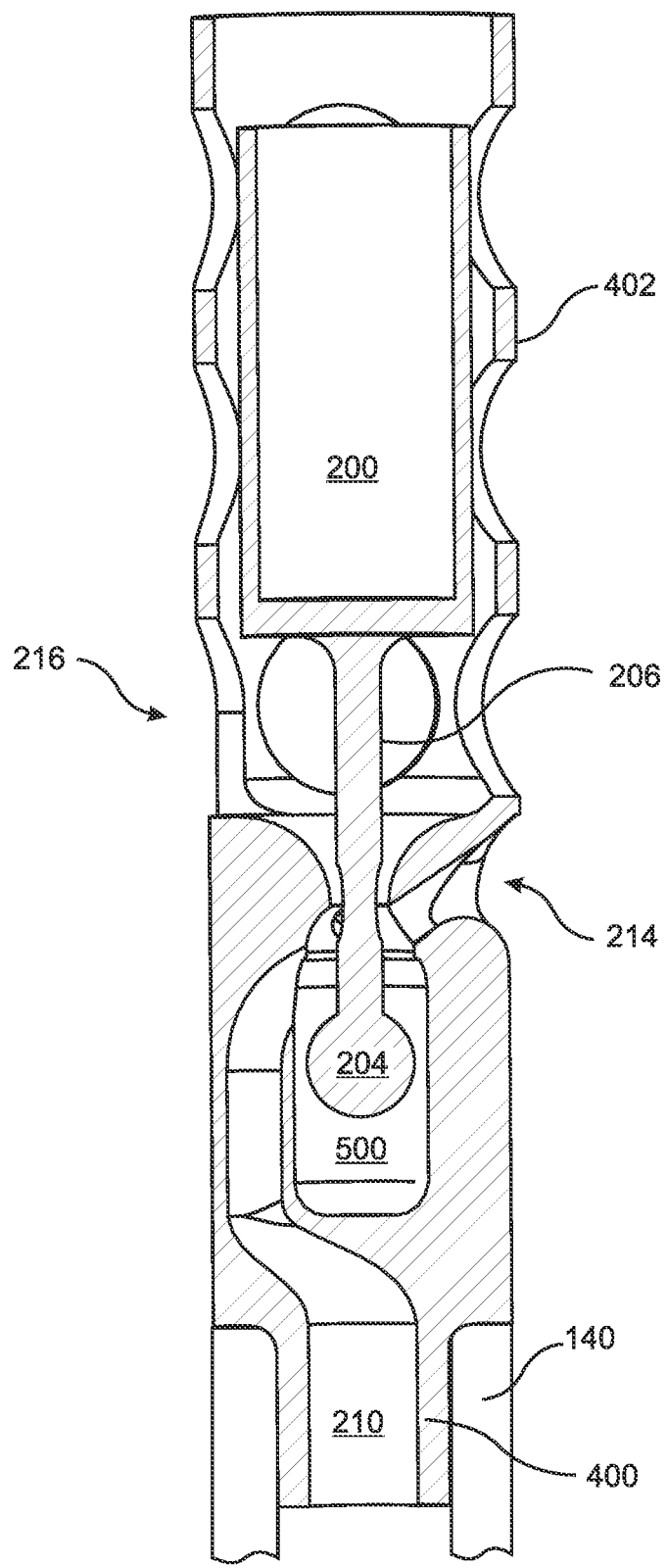
FIG. 5B is a cross-sectional side view of the third embodiment, shown in an open state.
Figure 5C:
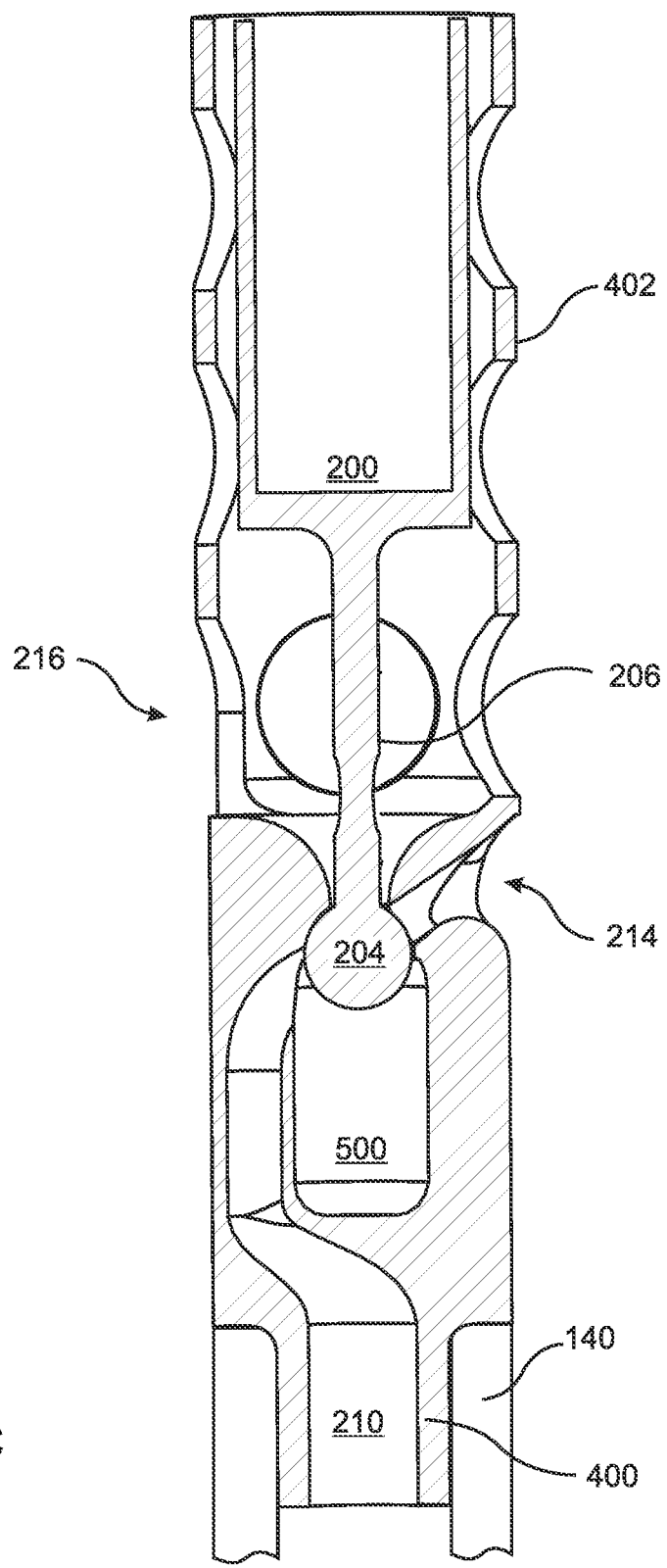
FIG. 5C is a cross-sectional side view of the third embodiment, shown in a closed state.

FIG. 5B shows the valve 100 in its open configuration, while FIG. 5C is a cross-sectional drawing illustrating the embodiment of FIG. 5B when the valve 100 is closed.

Figure 5D:
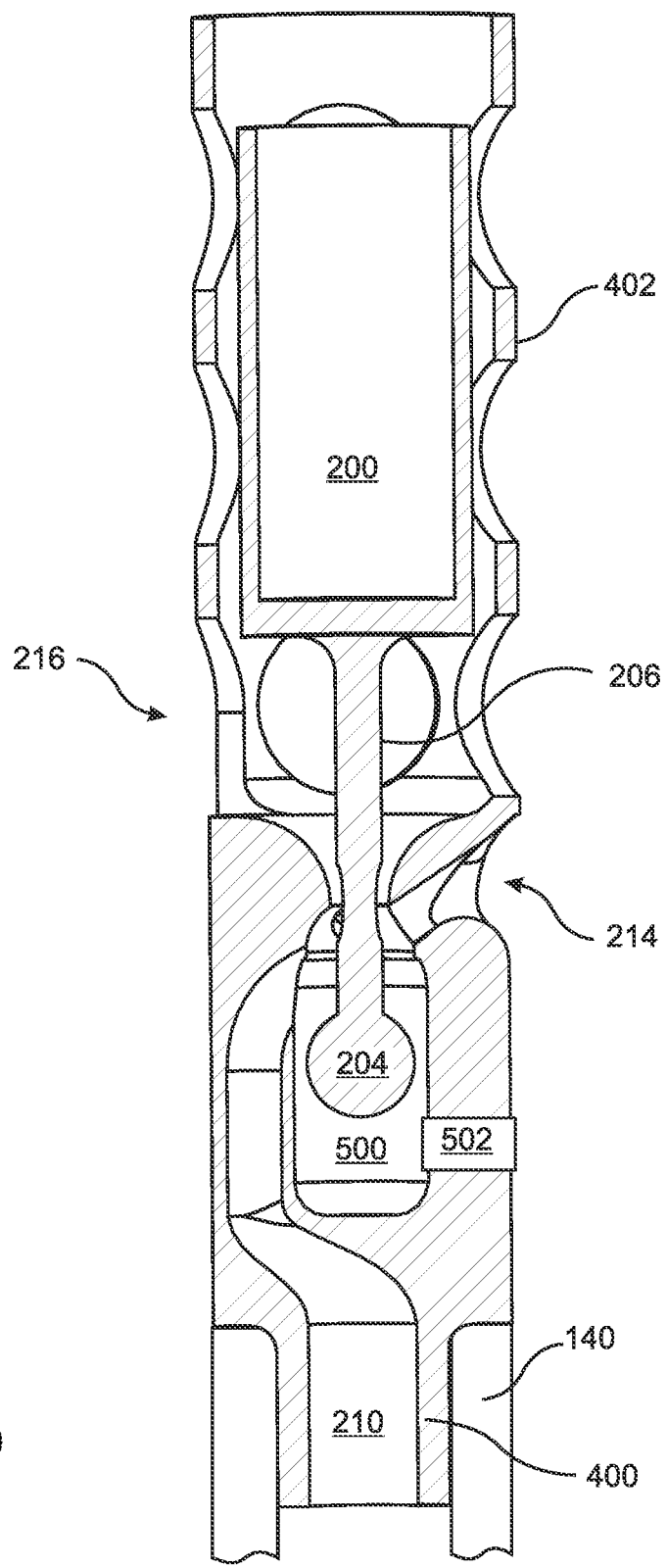
FIG. 5D is a cross-sectional side view of an embodiment similar to the third embodiment, but further including a check valve that is configured to enable draining of the holding tank when pressure is withdrawn from the standpipe, even if overfill prevention valve is closed.

With reference to FIG. 5D, embodiments of the present invention further include a check valve 502 that allows the liquid to drain out of the in the holding tank 102 even if the valve 100 is closed. The check valve, which functions as a liquid draining valve, is normally closed so long as there is liquid pressure within the standpipe 104. However, the check valve 502 is configured to automatically open when the liquid pressure within the standpipe 104 drops below a specified threshold pressure, thereby allowing any liquid that is within the holding tank to drain out of the holding tank 102, even if the valve is closed, if the liquid is withdrawn from the standpipe 104. This feature can be advantageous, for example, when the invention is implemented in a fuel-burning torch 108, because it can allow the torch 108 to be extinguished under remote control simply by draining or pumping the liquid fuel out of the standpipe 104, thereby emptying the holding tank 102, so that the torch 108 is extinguished as soon as the remaining fuel in the wick 110 is exhausted.

Figure 6A:
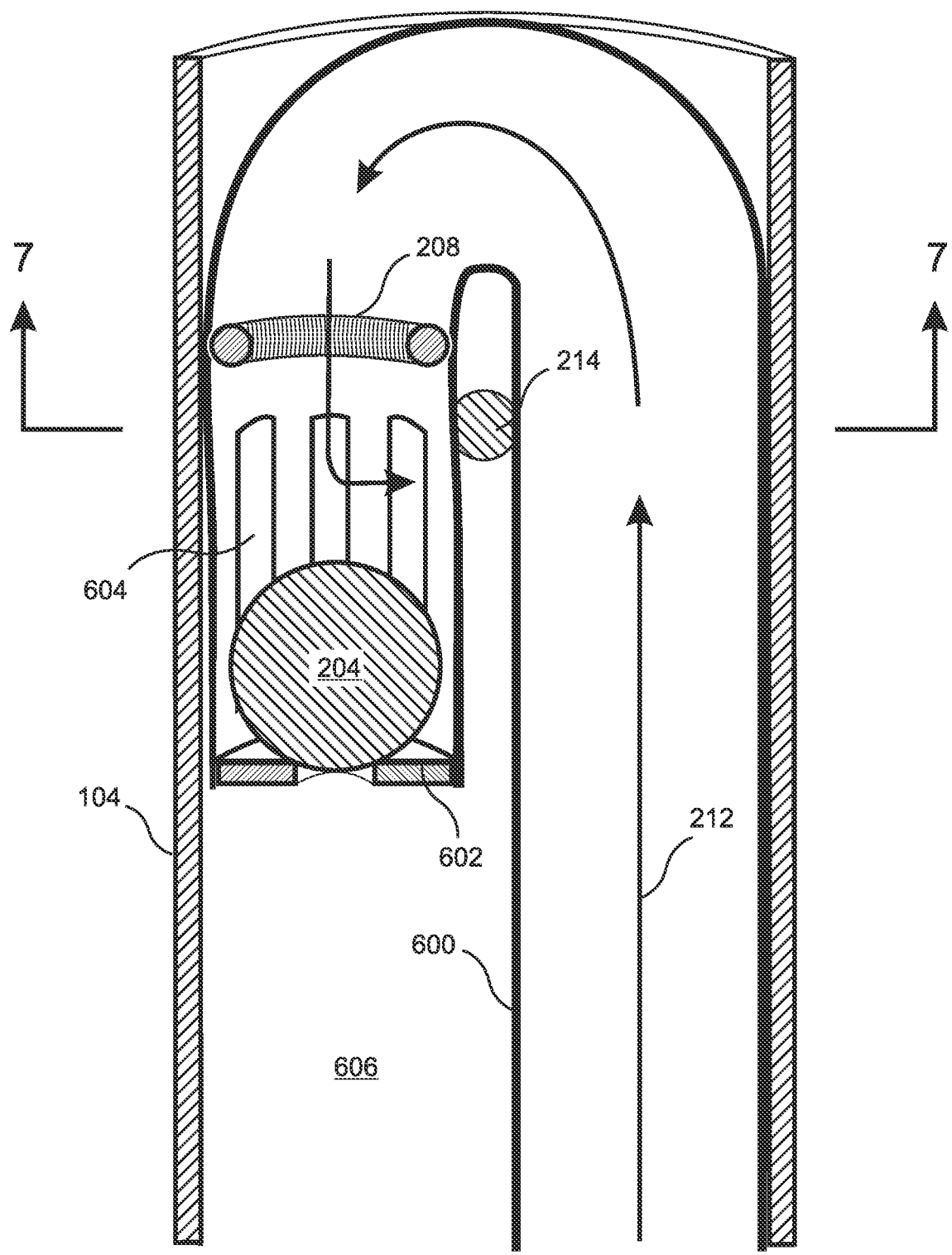
FIG. 6A is a sectional view of standpipe and liquid overfill prevention valve in a fourth embodiment of the present invention, shown in an open state.
Figure 6B:
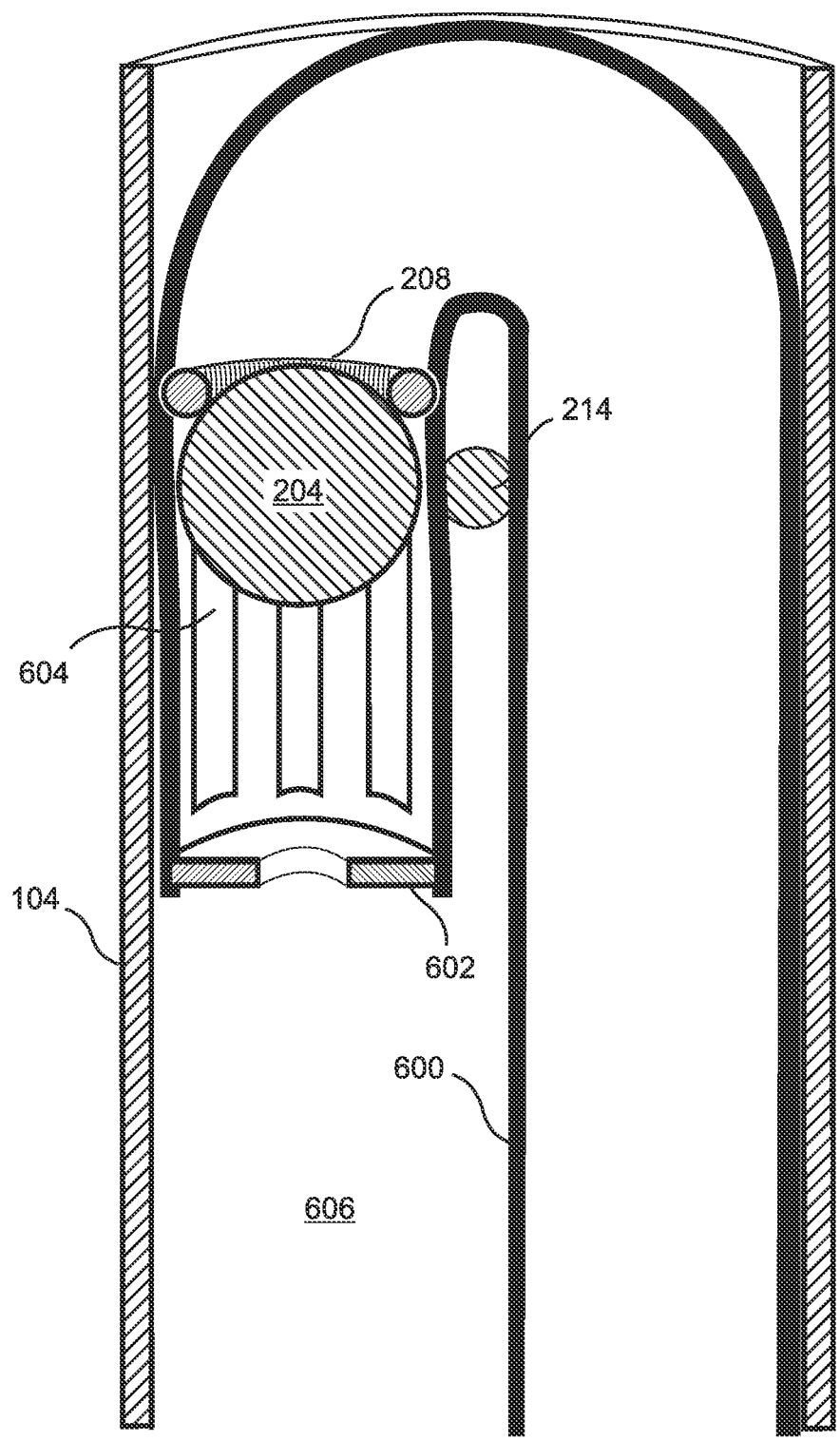
FIG. 6B is a sectional view of the fourth embodiment, shown in a closed state.

FIGS. 6A and 6B are sectional views of another embodiment of the present invention, in which an inner fill tube 600 is included within the standpipe 104. The top of the inner fill tube 600 is curved substantially by 180 degrees, so that the opening at the distal end of the liquid fill pipe 600 is directed downward. In this embodiment, the plug 204 is included within downward facing region of the liquid fill pipe 600, and is buoyant, so that a separate float is not needed. A ledge or lip 602 installed within the end of the liquid fill pipe 600, and functions to keep the plug 204 from falling out of the liquid fill pipe 600 when the standpipe 104 is not filled with liquid.

Filling ports 604 are provided in the side of the liquid fill pipe 600 near the plug 602, and an O-ring 208 is provided above the filling ports 604. In the illustrated embodiment, the O-ring 208 functions as the seat 202 of the liquid overfill prevention valve. When the plug 204 is not pressed against the O-ring 208, as shown in FIG. 6A, incoming liquid is easily able to flow from the liquid fill pipe 600 through the filling ports 604 into the region 606 within the standpipe 104 that surrounds the liquid fill pipe 600, and from thence through fill ports 214 and/or out through the top of the standpipe 104 into the holding tank 102. When the plug 204 is lifted by the rising liquid and is pressed against the O-ring 208, as is illustrated in FIG. 6B, the incoming flow of liquid is blocked.

Figure 7:
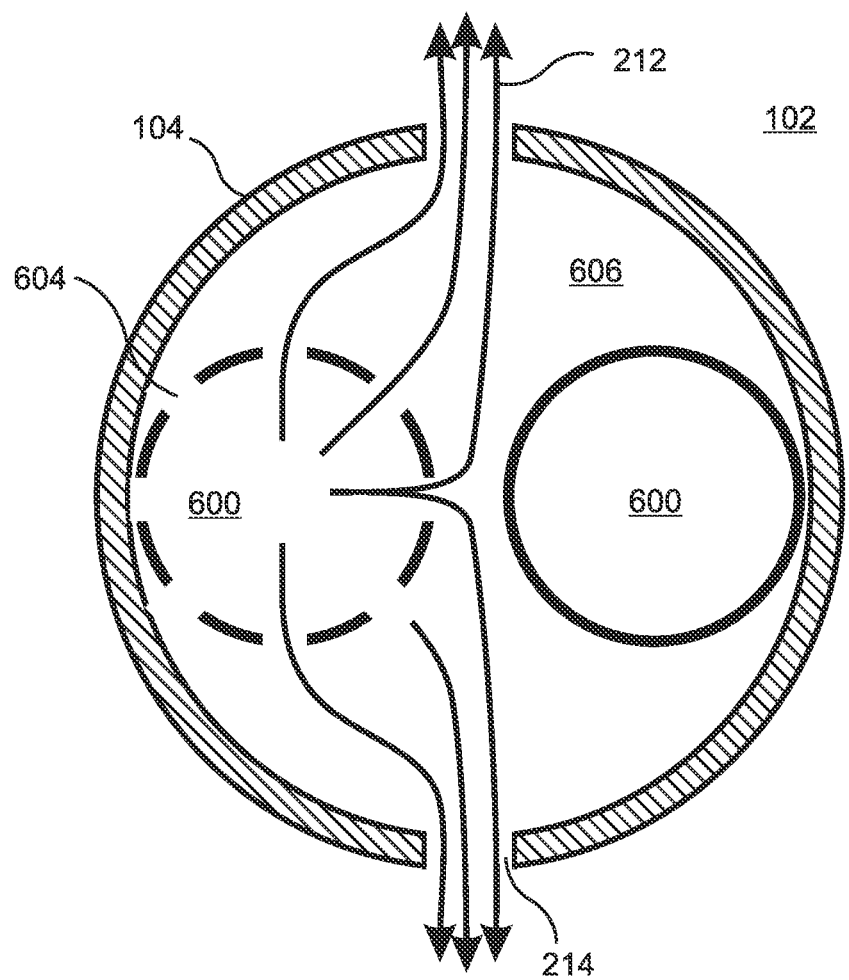
FIG. 7 is a horizontal cross-sectional view of the fourth embodiment.

FIG. 7 is a horizontal, cross-sectional illustration of the embodiment of FIG. 5A. It can be seen in the figure that the incoming liquid 212 flows from the liquid fill pipe 600 through the filling ports 604 into the space 606 between the liquid fill pipe 600 and the standpipe 104, and from thence through the fill ports 214 into the interior of the holding tank 102.

Figure 8:
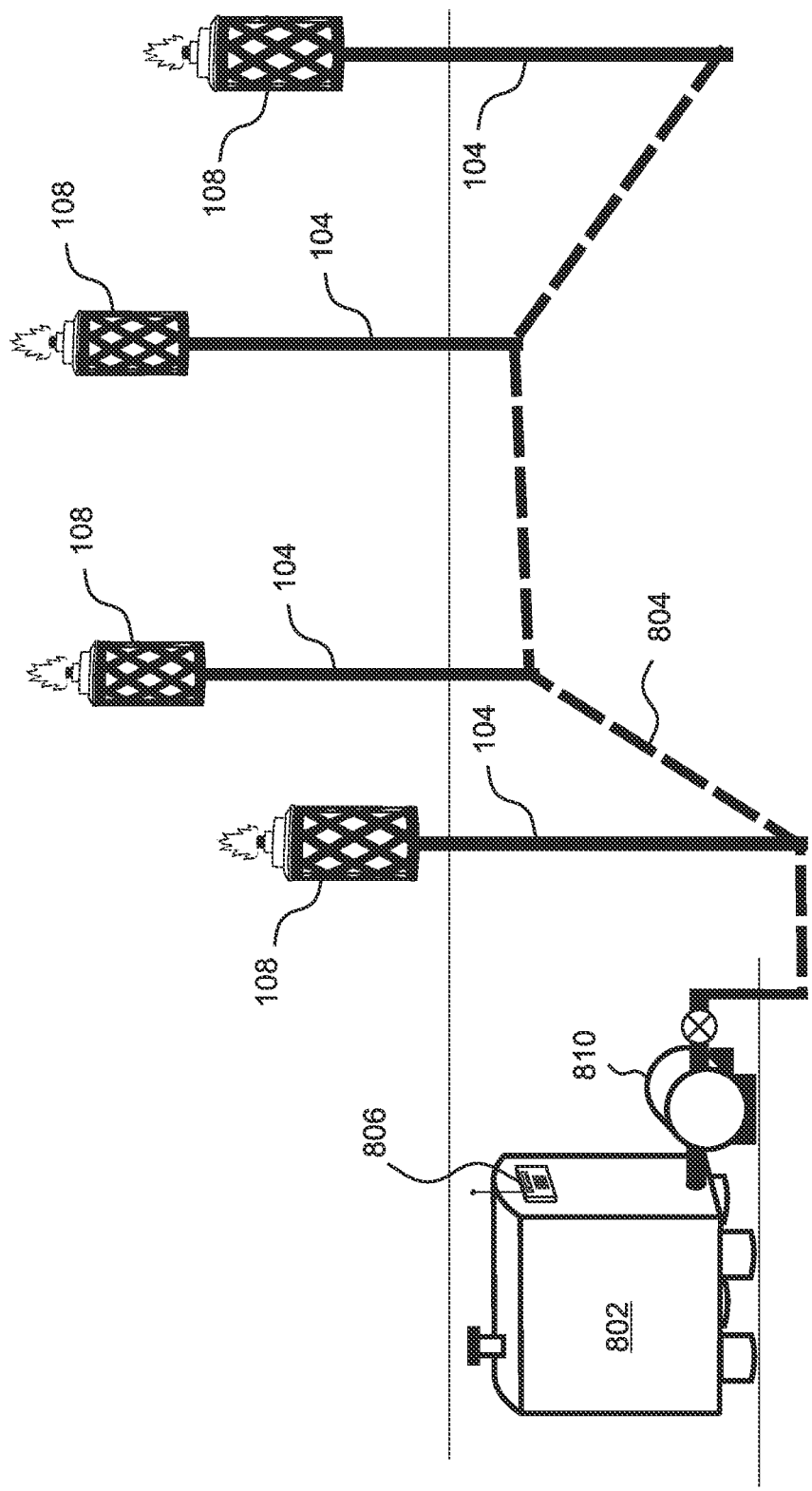
FIG. 8 is a perspective view of a system embodiment of the present invention that includes a plurality of liquid holding tanks that are automatically refilled from a common reservoir.

With reference to FIG. 8, system embodiments include a central liquid reservoir 802 that is connected in series to a plurality of liquid fill pipes 804 associated with a plurality of devices 108 that include liquid storage tanks 102, as well as a pump 810 that is configured to pressurize the liquid so that it flows into the liquid storage tanks 102. In some of these embodiments, the liquid in the liquid fill pipes 804 is maintained at pressure, so that storage tanks 102 are automatically re-filled whenever their overfill prevention valves 100 open. As a result, a relatively constant liquid level is maintained within each liquid storage tank 102. In the illustrated embodiment, the devices 108 are liquid fuel burning torches. If the check valve of FIG. 5D is included in the valves 100 within the torches 108, then the torches 108 can be extinguished by reversing the direction of the pump, thereby draining the fuel from the liquid fill pipes 804 and from the standpipes 104.

In embodiments operation of the pump 810 is stopped after a fixed operating time has elapsed, or upon sensing a backpressure in the fill pipes 804 that is above a specified maximum, indicating that all of the overfill prevention valves 100 are closed. In the illustrated embodiment, each of the liquid storage tanks 102 includes at least one electronic level sensor 112 that is inserted through a port provided near the top of the liquid storage tank 102. The level sensors 112 are monitored by a single, centralized controller 806, which activates the pump 810 whenever any one of the sensors 112 indicates a low liquid level, at which point each of the liquid storage tanks 102 is filled until its overfill prevention valve 100 is closed. Embodiments include additional level sensors in the liquid storage tanks 102 that sense when the holding tank 102 is full, and the central controller 806 shuts off the pump 810 when the sensors indicate that all of the tanks 102 have been filled. This approach can be advantageous, for example, to avoid spillage of significant quantities of the liquid if one of the overfill prevention valves 100 fails to close for some reason.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A liquid filling apparatus compatible for installation within a liquid holding tank, the liquid filling apparatus being configured to enable filling of the liquid holding tank with the liquid while preventing the liquid from overfilling the holding tank, the liquid filling apparatus comprising:
    a standpipe including a vertical section that is capable of being assembled into the liquid holding tank having an outer wall of substantially uniform diameter, the standpipe being configured to permit the liquid to flow therethrough into the interior of the liquid holding tank; and
    a liquid overfill prevention valve, wherein the liquid overfill prevention valve is either entirely contained within the vertical section of the standpipe, or extends in series beyond the vertical section of the standpipe and is surrounded by a valve collar that is not greater in diameter than the outer wall of the standpipe, the liquid overfill prevention valve comprising:
    an internal passage in liquid communication with the standpipe;
    a fill port in liquid communication with an interior of the holding tank;
    a valve seat, wherein the internal passage extends through the valve seat;
    a float; and
    a valve plug located within or below the valve seat and configured to be lifted by the float to form a seal with a constricted region of the valve seat when the liquid holding tank is filled with the liquid, the liquid overfill prevention valve being open when the valve plug is below the valve seat, and closed when the valve plug is sealed against the valve seat;
    the liquid overfill prevention valve, when open, being configured to allow the liquid to flow from the standpipe through the internal passage, through the fill port, and into the interior of the liquid holding tank;
    the liquid overfill prevention valve, when closed, being configured to prevent the liquid from flowing from the standpipe into the interior of the liquid holding tank;
    the float remaining within the standpipe or within the valve collar when the float is lifted by the liquid and the valve is closed.

2. The liquid filling apparatus of claim 1, wherein the float is located above the valve seat, and is interconnected to the valve plug by a rod or filament extending from the float through the central passage of the valve seat to the valve plug.

3. The liquid filling apparatus of claim 1, wherein the fill port penetrates the valve seat, thereby providing liquid communication between the internal passage of the valve seat and the interior of the liquid holding tank.

4. The liquid filling apparatus of claim 1, further comprising at least one overflow port located above the constricted region of the valve seat and configured to ensure that a liquid level at the float is equal to a liquid level in the holding tank.

5. The liquid filling apparatus of claim 1, wherein the standpipe extends both below and above the valve seat, but is interrupted by a region of the valve seat having an outer diameter that is the same as an outer diameter of the standpipe.

6. The liquid filling apparatus of claim 1, wherein the internal passage is configured to direct a flow of the liquid through a flow path to the fill port without the liquid flow directly impinging on the valve plug.

7. The liquid filling apparatus of claim 6, wherein when the liquid overflow prevention valve is open, the plug is suspended within a plug chamber that is in liquid communication with the liquid flow but is located below the flow path.

8. The liquid filling apparatus of claim 1, further comprising a draining valve configured to automatically open and allow the liquid to flow from the interior of the holding tank into the standpipe when the liquid overfill prevention valve is closed and a pressure of the liquid in the holding tank is greater than a pressure in the stovepipe by more than a threshold pressure difference.

9. The liquid filling apparatus of claim 1, further comprising a fill tube inserted within the standpipe, a distal end of the fill tube being shaped so as to be re-directed downward, the valve seat being installed within the downwardly directed portion of the fill tube, the liquid filling apparatus being configured when the liquid overfill prevention valve is open to enable the liquid to flow through the fill tube into the standpipe, and from thence into the interior of the liquid holding tank.

10. The liquid filling apparatus of claim 9, wherein the valve plug is the float.

11. The liquid filling apparatus of claim 9, further comprising a constriction provided at the distal end of the fill pipe, the constriction being configured to confine the valve plug so that it remains within the fill pipe.

12. The liquid filling apparatus of claim 1, further comprising an elastomeric sealing ring included in the constricted region of the valve seat and configured to form a seal with the valve plug when the valve plug is lifted into contact with the sealing ring.

13. The liquid filling apparatus of claim 1, wherein the valve plug is elastomeric, and is configured to form a liquid seal by direct contact thereof with the valve seat.

14. A liquid fuel burning torch comprising:
    a fuel tank having an interior;
    an insertion port provided in a bottom of the fuel tank; and
    a liquid filling apparatus according to claim 1, the liquid filling apparatus being inserted through the access port into the interior of the fuel tank.

15. A system comprising:
    a central liquid reservoir;
    a pump in liquid communication with the liquid reservoir;
    a plurality of liquid holding tanks, each of the liquid holding tanks having installed therein a corresponding liquid filling apparatus according to claim 1; and
    a liquid plumbing system interconnecting each of the liquid filling apparatuses with the pump.

16. The system of claim 15, wherein the liquid plumbing system interconnects the liquid filling apparatuses in series.

17. The system of claim 15, wherein the system is configured to maintain liquid pressure within the liquid plumbing system, each of the holding tanks being automatically refilled thereby whenever its corresponding liquid overfill prevention valve is open.

18. The system of claim 15, wherein a central controller is configured to cause the pump to be activated whenever a pressure of the liquid within the liquid plumbing system falls below a specified refill pressure, and to be deactivated when the pressure of the liquid within the liquid plumbing system rises above the specified refill pressure.

19. The system of claim 15, wherein a central controller is configured to cause the pump to be deactivated whenever a pressure of the liquid within the liquid plumbing system rises above a specified filled pressure.

\* \* \* \* \*